United States Patent [19]

Sommerer et al.

[11] Patent Number: 5,415,427
[45] Date of Patent: May 16, 1995

[54] WHEEL SUSPENSION SYSTEM

[75] Inventors: Karl Sommerer, Wiernsheim; Norbert Schote, Ammerbuch, both of Germany

[73] Assignee: Dr. Ing. h.c.F. Porsche AG, Germany

[21] Appl. No.: 117,136

[22] PCT Filed: Feb. 14, 1992

[86] PCT No.: PCT/EP92/00317

§ 371 Date: Sep. 14, 1993

§ 102(e) Date: Sep. 14, 1993

[87] PCT Pub. No.: WO92/16386

PCT Pub. Date: Oct. 1, 1992

[30] Foreign Application Priority Data

Mar. 14, 1991 [DE] Germany .................. 41 08 164.1

[51] Int. Cl.$^6$ ............................................. B60G 3/00
[52] U.S. Cl. .................................... 280/690; 280/691; 280/675
[58] Field of Search ............... 280/690, 691, 660, 675, 280/673, 688

[56] References Cited

U.S. PATENT DOCUMENTS

| | | | |
|---|---|---|---|
| 3,858,901 | 1/1975 | Johnson | 280/96.2 R |
| 4,462,609 | 7/1984 | van der Ohr | 280/690 |
| 4,840,396 | 6/1989 | Kako | 280/690 |
| 4,998,748 | 3/1991 | Kashiwagi et al. | 280/690 |
| 5,116,876 | 5/1992 | Moll | 280/691 |

FOREIGN PATENT DOCUMENTS

| | | |
|---|---|---|
| 0199915 | 11/1986 | European Pat. Off. . |
| 0265959 | 5/1988 | European Pat. Off. . |
| 1938850 | 5/1970 | Germany . |
| 2818198 | 10/1979 | Germany . |
| 3642421 | 6/1987 | Germany . |
| 3939313 | 5/1990 | Germany . |
| 3941083 | 6/1991 | Germany . |
| 2089742 | 6/1982 | United Kingdom . |

Primary Examiner—Eric D. Culbreth
Assistant Examiner—Christopher P. Ellis
Attorney, Agent, or Firm—Evenson, McKeown, Edwards & Lenahan

[57] ABSTRACT

A wheel suspension system is provided for the driven steered and unsteered rear wheels of a motor vehicle comprising a wheel carrier which is supported on the vehicle body side by way of a spring strut. This wheel carrier is guided by two individual links forming and upper pivotal connection and by way of a lower pivotal connection consisting of an A-arm as well as a tie rod link extending approximately in the transverse direction of the vehicle. The individual links are arranged in a diverging manner in the vehicle transverse direction and are disposed in two spaced joints of the wheel carrier and, the A-arm is held on the wheel carrier by a joint so that both pivotal connections form an elastokinematic wheel swivelling axis and a kinematic swivelling axis. The two pivotal connections are so arranged and supported in joints such that a wheel suspension system is obtained which, on one hand, ensures a secure vehicle handling in all driving conditions with a good driving comfort and on the other hand, can be arranged in the vehicle in a spatially compact manner.

30 Claims, 4 Drawing Sheets

WHEEL SUSPENSION SYSTEM

BACKGROUND AND SUMMARY OF THE INVENTION

The present invention relates to a wheel suspension system for the driven rear wheels of a motor vehicle in a steerable and non-steerable arrangement and, more particularly, to a wheel suspension system comprising a wheel carrier which is supported by way of a spring strut on the vehicle body side and which is guided by way of two individual links forming an upper pivotal connection and by way of a lower pivotal connection consisting of an A-arm with a tie rod link which extends approximately in the transverse direction of the vehicle. The pivotal connections are supported on the vehicle body side in joints of different radial characteristics, and the individual links are arranged in a diverging manner in the vehicle transverse direction and are disposed in two spaced joints of the wheel carrier. The A-arm is held by a joint on the wheel carrier, and both pivotal connections form an elastokinematic wheel swivelling axis, which is disposed on the outer side of the wheel, with a steering pole in the wheel contact plane which is disposed, with respect to the driving direction, behind a perpendicular wheel center transverse plane and outside the perpendicular wheel center longitudinal plane.

A twin control arm suspension for unsteered wheels is described in a published report entitled, On the Sixth International Technical Conference on Experimental Safety Vehicles; Oct. 12-15, 1976, Pages 656 to 664) which comprises a lower A arm and an upper opened up control arm with two individual links, adjacent to which another link is assigned. The pivotal connections, which are arranged in superimposed horizontal planes, together form an elastokinematic swivelling axis for a wheel position change when longitudinal and lateral forces affect the wheel. For this purpose, the swivelling axis is aligned in such a manner that a wheel steering pole is formed in the wheel contact plane which is situated outside the wheel track and, with respect to the driving direction, behind a perpendicular wheel center transverse plane.

Furthermore, German Patent Document DE-PS 19 38 850 describes a wheel suspension system for steered front wheels comprising a lower A-arm and an upper opened-up control arm. The connecting lines of the intersecting points of the longitudinal axes of these suspension links situated in horizontal planes arranged above one another form an elastokinematic swivelling axis of the wheel.

Furthermore, from German Patent Document DE-OS 36 42 421 describes a wheel suspension for unsteered wheels of a motor vehicle which has a lower A-arm and an upper opened-up control arm as well as a tie rod. On the side of the vehicle body, the A-arm is held in longitudinally elastic bearings. The tie rod is supported in a joint and causes, when longitudinal and lateral forces act upon the wheel, a displacement of the A-arm in the longitudinal direction and, as a result, a wheel position change is triggered in the toe-in direction.

These known arrangements of suspension links with the forming elastokinematic swivelling axis of the wheel and an occurring wheel steering pole in the wheel contact plane cause wheel position changes in the driving operation. These are achieved only insufficiently by forces acting upon the wheel as well as during compression movements so that, on the whole, no stable vehicle handling is ensured along the entire speed range with the superposition of braking and starting or accelerating forces during cornering and straight-ahead driving.

Because of the pivotal connections to the vehicle body and a resulting setting and position with respect to the vehicle wheel, the effects of the known wheel suspensions are geared only to a special vehicle. A transfer of this known wheel suspension to a vehicle of a defined construction is not possible in a simple manner because of the different vehicle body structures and resulting changed pivotal connecting points on the vehicle body as well as their dimensions so that, when the driving conditions differ, a desired wheel position change is not optimally ensured.

The present invention is based on an object of providing a wheel suspension system in a twin control arm construction for steered and unsteered rear wheels of a motor vehicle which, on one hand, ensures a secure vehicle handling in all driving conditions with a good driving comport and, on the other hand, the wheel suspension system can be housed in the vehicle in a compact shape with respect to space.

According to the present invention, this object has been achieved by arranging the two pivotal connections, with respect to the driving direction, in inclined planes extending diagonally toward the front in a rising manner and are set at an angle with respect to one another. In these planes, by way of the vehicle-body-side joints of the two pivotal connections, spaced link rotating axes are formed which, in lateral view and viewed in the driving direction, are set at different angles with respect to the wheel contact surface and, in top view, are arranged to be crossed with respect to one another at an angle. The wheel-carrier-side joints of the two pivotal connections which are opposite the two link rotating axes, are situated close to a perpendicular wheel center transverse plane and directly adjacent to a perpendicular wheel center longitudinal plane. The vehicle-body-side joints of the two pivotal connections have a radial characteristic which is defined differently for the swivelling in the toe-in direction about the forward joint of the lower pivotal connection. Alternatively, between the tie rod links of each wheel side, an adjusting device for a rear-wheel steering is arranged which is connected with the free inner ends of each of the tie rod links which extend at an angle of almost 90° with respect to the perpendicular wheel center longitudinal plane.

The two pivotal connections, in the present invention, are with respect to the driving direction arranged in inclined planes such that they rise diagonally toward the front and are set at an angle with respect to one another. In these planes, spaced link rotating axes are formed by the vehicle-body-side joints which, in the lateral view and viewed in the driving direction, are disposed at differently sized angles with respect to the wheel contact surface and, in the top view, are arranged crossed with respect to one another at an angle. The wheel-carrier-side joints of the two pivotal connections, which are opposite the two link rotating axes, are arranged close to a perpendicular wheel center transverse plane and directly adjacent to a perpendicular wheel center longitudinal plane. By way of the pivotal connections, an elastokinematic wheel swivelling axis is formed which, with respect to the driving direction, forms a steering pole in the wheel contact plane which is situated behind the vertical wheel center transverse plane and outside the perpendicular wheel center longitudinal plane. The vehicle-body-side joints of the pivotal connections have a radial characteristic which is defined for the elastic swivelling about the forward joint of the lower pivotal connection.

In the case of this arrangement and construction of the two pivotal connections as well as the defined characteristics of the joints, when longitudinal and laterall forces act upon the wheel, a targeted wheel position change is achieved in the toe-in direction about the joint of the lower A-arm, which is essentially caused by an elastokinematic swivelling axis with a piercing point in the wheel contact plane. This swivelling axis extends through intersecting points of the longitudinal axes of the links which are formed by the upper pivotal connection and the lower pivotal connection with the tie rod links. Because of the setting of the links of both pivotal connections, the swivelling axis has a position outside the perpendicular wheel center longitudinal plane with a piercing point (or wheel steering pole) outside the track width or of the perpendicular wheel center longitudinal plane and, with respect to the driving direction, behind the perpendicular wheel center transverse plane. By way of this arrangement of the wheel steering pole, an understeering tendency of the vehicle is achieved at the start of a cornering operation.

For the wheel adjustment under the effect of forces, the vehicle-body-side link bearings of the two pivotal connections have radial characteristics that are coordinated with one another in such a manner that the wheel can swivel virtually about the joint of the lower pivotal connection which is forward, with respect to the driving direction, and forms a pivot, and the rearward joint has for this purpose a much softer radial characteristic than the forward joint. Corresponding to the forward link of the lower pivotal connection, the tie rod link is supported in a radially hard manner on the vehicle body side. In the case of the upper pivotal connection, the forward individual link is supported in a harder manner on the vehicle body side than the rearward individual link. The tie rod link is constructed and disposed such that a significant proportion of the force, in the case of lateral force, is absorbed by this link.

The position of the elastokinematic swivelling axis is essentially determining for the desired wheel position changes in any driving condition. In order to achieve a favorable influencing of the handling of the motor vehicle, the two pivotal connections or the relevant links must be set correspondingly with respect to one another or the joints on the wheel carrier and on the vehicle body must have a corresponding position. Thus, it is advantageous for the piercing point (steering point) of the swivelling axis in the wheel contact plane to be situated at a relatively large distance from the perpendicular wheel center longitudinal and transverse plane. This is achieved when the swivelling axis, in the lateral view, extends from the steering pole situated behind the perpendicular wheel center transverse plane diagonally forward and intersects with the perpendicular wheel center transverse plane approximately at the level of the wheel-carrier-side joint of the rearward individual link of the upper pivotal connection. Another contributing factor is that the wheel-carrier-side joint of the A-arm is arranged closer to the perpendicular wheel center longitudinal plane than the corresponding joint of the tie rod link. The position of the individual links of the upper pivotal connection as well as the position of the wheel-carrier-side joint of the two individual links of the upper pivotal connection also contribute significantly to the fixing of the elastokinematic swivelling axis.

In the case of unsteered rear wheels, the tie rod links of the lower pivotal connection of both wheel sides are supported on the vehicle body or on a subframe. In contrast, in the case of steered rear wheels, these tie rod links are connected with an interposed control cylinder. As a function of the respective condition of the motor vehicle, this control cylinder causes a steering wheel adjustment.

Another swivelling axis, specifically the kinematic swivelling axis which acts particularly in the case of steerable rear wheels, is formed by the arrangement of the links of the upper and lower pivotal connections with respect to one another as well as by the position of the joints on the vehicle body as well as on the wheel carrier. Therefore, the kinematic swivelling axis extends through intersecting points formed by the longitudinal axes of the links, in a lateral view, from the wheel contact surface diagonally to the upward rear against the driving direction. Furthermore, this kinematic swivelling axis is arranged in front of the perpendicular wheel center transverse plane. As a result, a positive caster angle is formed so that, during the steering, the wheel that is on the outside during cornering can go into a negative camber, which is an advantage for increasing the maximally possible transmissible lateral force. In addition, as the result of the position of the kinematic swivel axis, a negative disturbing-force lever arm is obtained so that elastokinematics are achieved that are as favorable as possible, and a correction of the toe-in value can take place, for example, in the case of a load change, as well as during braking.

The rear axle according to the invention is constructed such that solely by way of the linking of the tie rod link to a control cylinder, a use as a steerable rear axle is achieved without the requirement of changing the geometry of the upper and lower pivotal connection. So that a more favorable lever arm is achieved for the steering, the tie rod link may be transferred from its course, with respect to the driving direction, from the front outside to the rear inside to the vehicle longitudinal center axis into a position where the tie rod link is arranged at an angle of almost 90° with respect to the perpendicular wheel center longitudinal plane. As a result, a larger lever arm is obtained between the perpendicular wheel center transverse plane and the tie rod link than in the case of a setting of the tie red link when the rear wheels are not steered.

In particular, the tie rod link is arranged approximately in the same horizontal plane as the wheel-carrier-side joint of the A-arm and is held in the joint of an inwardly projecting arm of the wheel carrier, in which case the joint is arranged between the vehicle-body-side and the wheel-carrier-side joints of the two pivotal connections. As a result of this position of the joint, which is assigned to the wheel, on the arm of the wheel carrier, the spring strut can at the same time be supported by its lower end, in which case the tie rod link and the spring strut are held on a common axis.

The link rotating axes of the two pivotal connections formed by the vehicle-body-side joints are arranged in such a manner that one link rotating axis of the upper pivotal connection is arranged closer to the perpendicular longitudinal center plane of the wheel than the other link rotating axis of the lower pivotal connection. Both axes of rotation are, in the top view and viewed in the driving direction, arranged to be extending diagonally from the outside toward the inside front to the vehicle longitudinal center axis and at an acute opening angle with respect to one another. This slight crossing or the link rotating axes of the two pivotal connections with respect to one another is configured, in the case of compression movements, for a slight toe-in change. The upper and the lower pivotal connection are set in the diagonal planes to be extending by the link rotating axes at an opening angle with respect to one another, viewed in the driving direction, to the front interior in such a manner that an antisquat is increased by way of the compression path of the vehicle in the case of driving forces and load changes. This effect is achieved by the movement of the wheel, which is held by way of the two pivotal connections, with its wheel spin axis during the compression on a progressive curved path and, rises toward the rear, with respect to the driving direction, and the wheel spin axis moves on this curved path. The antisquat which rises by way of the compression path changes, by way of the positive and negative output forces (acceleration and load change), the rolling moment distribution of the front axle and the rear axle. During acceleration, the rear axle of the vehicle takes over a higher proportion of the rolling torque distribution; during a load change this proportion becomes smaller which leads to a tendency to understeer during a load change.

Furthermore, the link rotating axes extend in diagonal planes with respect to one another in such a manner that a pitching pole is obtained which, with respect to the driving direction, is situated in front of the wheel spin axis. By virtue of this position of the pitching pole, which forms because of the position of the upper and the lower pivotal connection as well as their joints with respect to one another, a linear antidive effect is achieved by way of the spring path. Thus, during a braking, the wheel contact point can move in a straight line toward the rear at an angle with respect to the wheel contact plane. As a result, a compromise is advantageously achieved between the tendency to understeer during the braking and a rebounding of the rear axle that is as low as possible.

In the lateral view, the spring strut is arranged approximately in parallel with respect to the perpendicular wheel center transverse plane and, with respect to the driving direction, is supported behind this plane on the wheel carrier. Furthermore, the spring strut extends between the tie rod link and the lower A-arm, on one side, and between the two upper individual links, on the other side, and is set approximately perpendicularly with respect to the wheel contact plane. As a result, in the interaction of the two pivotal connections, a favorable spring ratio is achieved because the lower pivotal connection of the spring strut is arranged relatively close to the wheel. The perpendicular position of the spring strut, in the lateral view, as well as the arrangement between the lower wishbone and the tie rod link results, during suspension operations, advantageously in no wheel position changed in the toe-in and toe-out direction.

The tie rod link is situated approximately in a horizontal plane with the lower pivotal connection so that the wheel suspension system according to the invention is also well suited for a rear engine and all-wheel steering. By way of its pivotal connections, the present wheel suspension system according to the invention may be supported by way of joints on a subframe as well as on the vehicle body. The subframe is supported on the vehicle body by way of elastic elements.

Because of its arrangement, the A-arm is stressed only with respect to tension and pressure so that a connecting strut between the links is not necessary and a so-called open A-arm is used which has a light construction.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
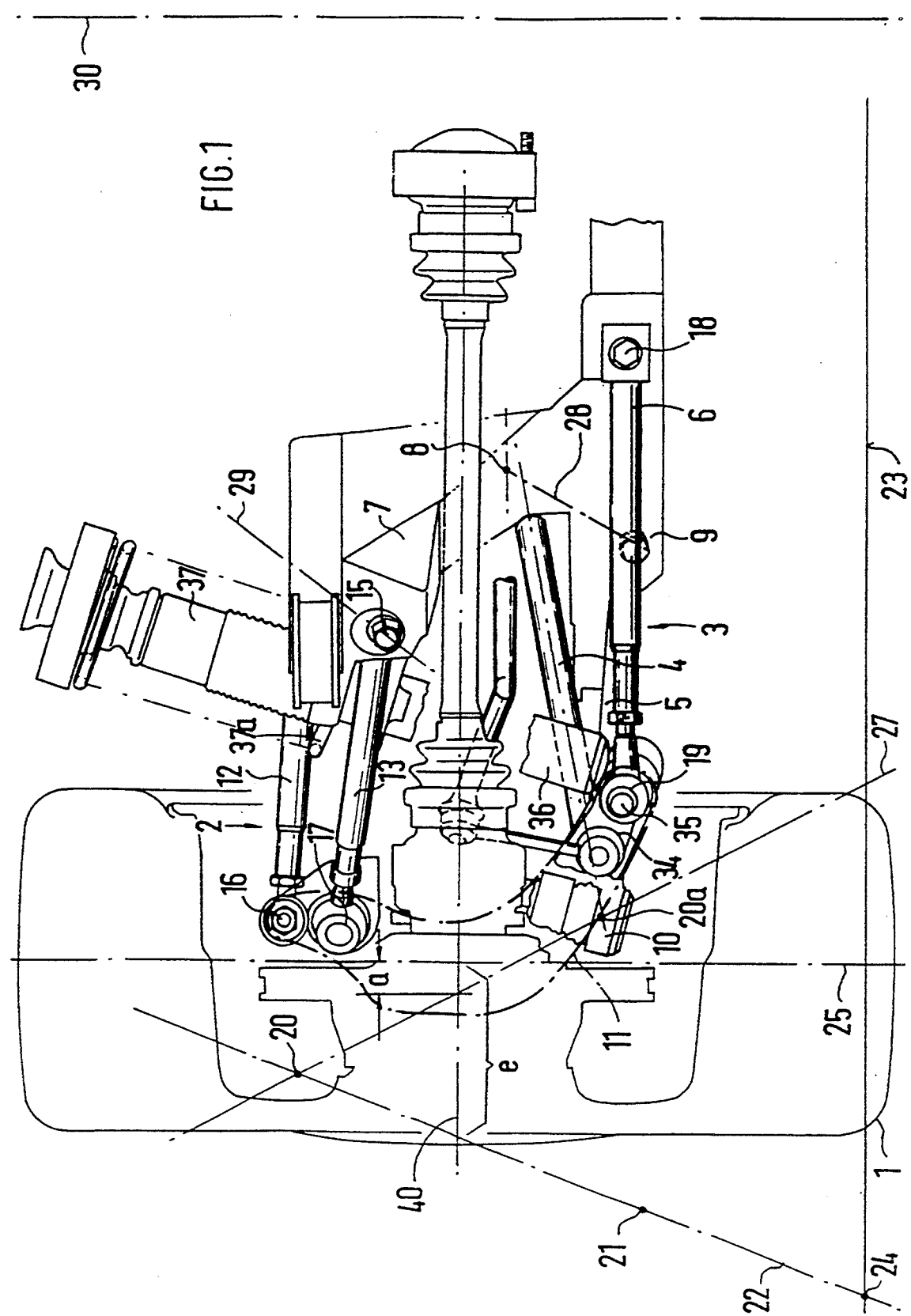
FIG. 1 is a frontal view of a wheel suspension system with an upper pivotal connection comprising two individual links and a lower pivotal connection comprising an A-arm with a tie rod link.
Figure 2:
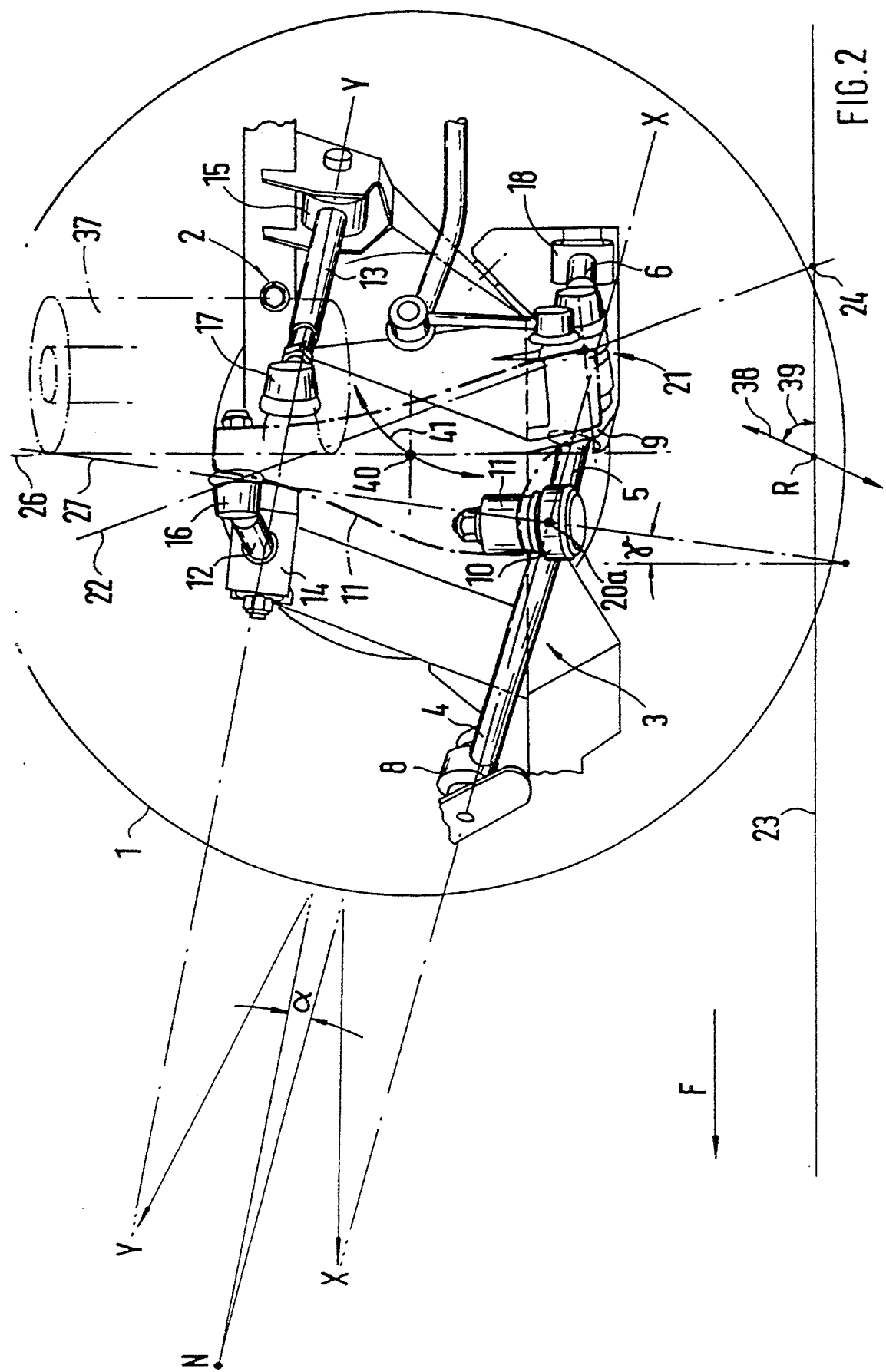
FIG. 2 is a lateral view of the wheel suspension system according to FIG. 1.

The wheel suspension system for the driven rear wheels 1 of a motor vehicle comprises pivotal connections 2 and 3 arranged in superimposed inclined planes X—X and Y—Y (FIG. 2). The pivotal connection 3 arranged in the lower plane X—X comprises an A-arm with two directly connected links 4 and 5 and a tie rod link 6. By way of joints 8 and 9 held on the vehicle body 7 and a joint 10 on the wheel carrier 11, the vehicle wheel 1 is guided in the plane X—X. The other pivotal connection 2 arranged in the upper plane Y—Y comprises two individual links 12 and 13 which are supported on the vehicle body 7 by way of a respective joint 14 and 15 and on the wheel carrier 11 by way of additional joints 16 and 17.

With respect to the driving direction F, the tie rod link 6 is arranged behind the lower pivotal connection 3 and has a vehicle-body-side joint 18 and a wheel-carrier-side joint 19.

The longitudinal axes of the links 4 and 5 of the lower pivotal connection 3 as well as the longitudinal axes of the individual links 12 and 13 of the upper pivotal connection 2 form intersecting points 20 and 21 which determine an elastokinematic swiveling axis 22. This swivelling axis 22 has a piercing point in the wheel contact plane 23 which forms a wheel steering pole 24. This wheel steering pole 24 is situated outside the perpendicular wheel center longitudinal plane 25 and, with respect to the driving direction, behind the perpendicular wheel center transverse plane 26. This wheel steering point 24 is arranged at a shorter distance b from the perpendicular wheel center transverse plane 26 than from the perpendicular wheel center longitudinal plane 25 at the distance d.

A kinematic wheel swivelling axis 27 which essentially has an effect in the case of steerable rear wheels extends through the point of intersection 20 formed by the longitudinal axis of the individual links 12 and 13 as well as through the center of the single wheel-carrier-side joint 10 of the lower pivotal connection 3.

Figure 3:
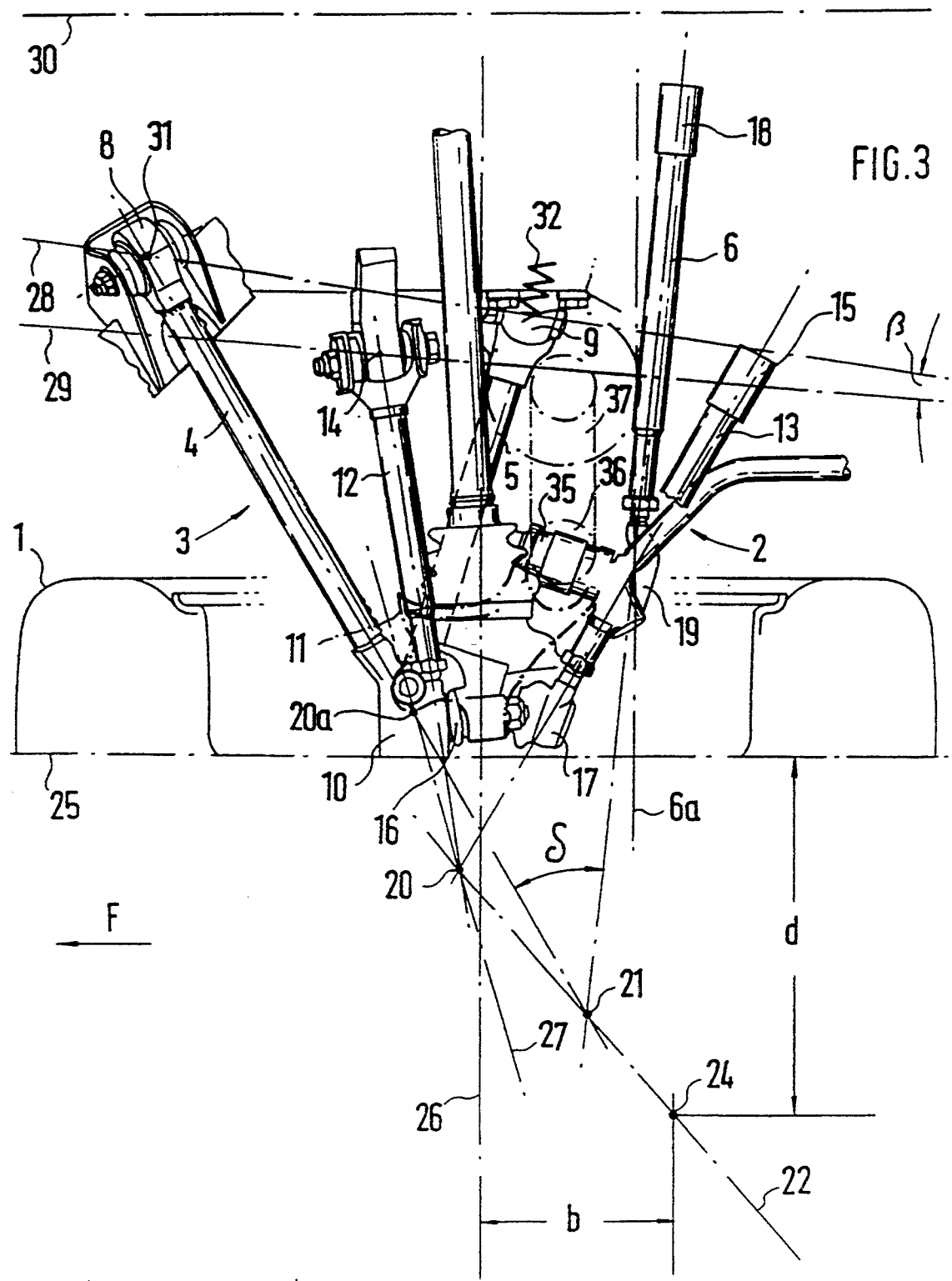
FIG. 3 is a top view of the wheel suspension system according to FIG. 1.
Figure 4:
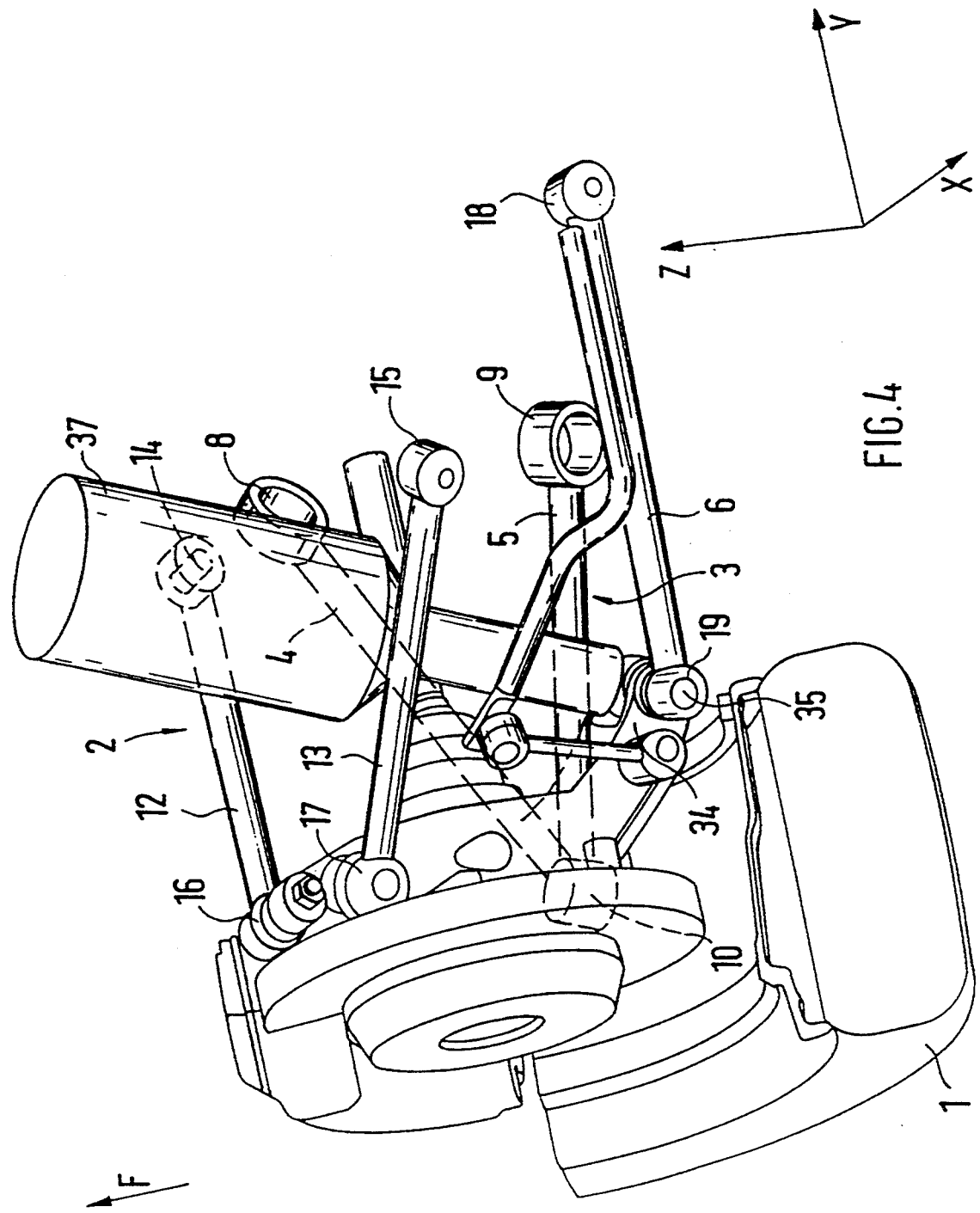
FIG. 4 is a diagrammatic representation of the wheel suspension system according to the present invention.

With respect to the driving direction F, the two pivotal connections 2 and 3 are arranged in inclined planes X—X and Y—Y which rise diagonally to the front and, as illustrated in detail in FIG. 2, are set at an angle α with respect to one another. In these planes X—X and Y—Y, spaced link rotating axes 28 and 29 are formed by way of the vehicle-body-side joints 8, 9, and 14, 15. According to FIG. 2 and viewed in the driving direction F, these link rotating axes 28 and 29 are set at different angles with respect to the wheel contact surface 23 and, according to FIG. 3, are arranged crossed at an angle B with respect to one another. In particular, the upper pivotal connection 2 is constructed such that its link rotating axis 29 is situated closer to the perpendicular wheel center longitudinal plane 25 than the other link rotating axis 28 of the other pivotal connection 3. The course of these link rotating axes 28 and 29 (FIG. 3) is selected such that they extend diagonally from the outside to the inside front to the vehicle longitudinal center axis 30 and are arranged at an acute opening angle β with respect to one another, and the perpendicular planes which are placed through the link rotating axes 28 and 29 are arranged at an acute opening angle. This angle opens in the driving direction F.

The lower pivotal connection 3 is held on the motor vehicle body 7 or an a subframe (not shown) by way of joints 8 and 9 of different radial characteristics. The bearing 8 of the link 4, which, with respect to the driving direction F, is disposed in front, is constructed to be so hard radially that it virtually forms a perpendicular axis of rotation 31 or a pivot about which the A-arm 3 can be swivelled with respect to its other bearing 9 of the link 5. For this purpose, the bearing 9 has a relatively soft radial characteristic 32. In contrast, the upper pivotal connection 2 has bearings 14 and 15 which a relatively hard radial characteristic, in which case the bearing 15 of the individual link 13 has a softer construction than the front joint 14 but is significantly harder than the joint 9 of the lower link 5. The vehicle-body-side joint 18 of the tie rod link 6 is also constructed to be hard in the radial direction. As a result, a swivelling of the wheel suspension becomes possible when the link is displaced essentially about the swivelling axis 23.

The A-arm 3 is disposed on the wheel carrier 11 by way of the sole joint 10 which is arranged at approximately the same distances from the perpendicular wheel center transverse plane 26 and from the wheel center longitudinal plane 25. This joint 10 also forms a first intersecting point 20a for the kinematic swivelling axis 27. A second intersecting point 20 is formed by the upper pivotal connection 2, specifically by the intersecting longitudinal axes of the individual links 12 and 13. The kinematic swivelling axis 27, which extends through these intersecting points 20 and 20a, extends, with respect to the lateral view in FIG. 2, from the wheel contact surface 23 diagonally toward the upward rear against the driving direction F. As a result of the position of the intersecting points 20 and 20a, the swivelling axis 27 is situated in front of the perpendicular wheel center transverse plane 26. As a result, a positive wheel caster angle and a negative disturbing-force lever arm-a are obtained. This kinematic swivelling axis is particularly effective when the wheel suspension system according to the invention is used for steerable rear wheels.

The longitudinal axes of the individual links 12 and 13 of the upper pivotal connection 2, which are determined by the vehicle-body-side joints 14 and 15 and the wheel-carrier-side joints 16 and 17, also form the upper intersecting point 20 for the elastokinematic swivelling axis 22 which extends through the lower intersecting point 21 formed by the longitudinal axes of the forward link 4 of the lower pivotal connection 3 and the longitudinal axis of the tie rod link 6. For arranging this elastokinematic swivelling axis 22 with the wheel steering pole 24 relatively far (distance d) outside the perpendicular wheel center longitudinal plane 25 and at a smaller distance b from the perpendicular wheel center transverse plane 26, the forward link 4 is arranged at a larger angle to the perpendicular wheel center transverse plane 26 than the tie rod link 6.

According to FIG. 2, the elastokinematic swivelling axis 22 extends from the steering pole 24 situated behind the perpendicular wheel center transverse plane 26 diagonally toward the front through the upper intersecting point 20 of the longitudinal axes of the individual links 12 and 13. For this purpose, these are arranged closer to the perpendicular wheel center longitudinal plane 25 and at approximately the same distance to the wheel center transverse plane 26. Since the two individual links 12 and 13 are supported by a relatively large base on the vehicle body side in the joints 14 and 15, a large distance e is formed at the level of the wheel spin axis 40 between the elastokinematic swivelling axis 22 and the perpendicular wheel center longitudinal plane 25.

According to FIG. 3 and viewed in the driving direction, the tie rod link 6 extends with a slope of approximately <10° diagonally from the outside front to the inside rear to the vehicle longitudinal center axis 30. The link 6 is arranged at approximately the same level as the lower pivotal connection 3 and is supported by its joint 19 on an inwardly projecting arm 34 of the wheel carrier 11.

This joint 19 of the link 6 is held on a shaft 35 of a pin which at the same time forms a lower bearing 36 for a spring strut 37. For this purpose, the joint 19 is arranged between the vehicle-body-side and the wheel-carrier-side joints of the two pivotal connections 2 and 3. With respect to the wheel-carrier-side joint 10 of the A-arm 3, the joint 19 is arranged to be farther from the perpendicular wheel center longitudinal plane 25 than the joint 10 of the lower pivotal connection 3.

The tie rod link 6 can be used in the same manner for unsteerable rear wheels 1 as well as for steerable rear wheels in the case of steerable rear wheels, the same tie rod 6 is used but the position of the tie rod 6a for the steering is aligned such that it is disposed almost at an angle of 90° to the perpendicular wheel center longitudinal plane 25, which is illustrated by a dash-dotted line in FIG. 3. This results in a larger lever arm for the steering of the wheels. A conventional control cylinder, which is required between the tie rod links 6a for the steering, is not shown because it is known how to incorporate same in the steering system.

As illustrated in detail in FIG. 2, a forward pitching pole N to provide an antidive is formed as a result of the diagonal setting of the rotating axes 28 and 29 of the links at an angle α with respect to one another. In this case, during a braking, the wheel contact point R will move linearly on the straight course 38 (FIG. 2) which extends at an angle 39 with respect to the wheel contact surface 23, with respect to the driving direction F, toward the rear.

For achieving a progressive antisquat, the wheel spin axis 40 will move as a result of driving forces in the case of compression movements on a curved path 41 which is curved toward the rear, with respect to the driving direction, which is illustrated in detail in FIG. 2.

The spring strut 37 with the surrounding coil spring 37a, according to FIG. 2, is arranged approximately in parallel to the perpendicular wheel center transverse plane 26 and is supported behind this plane on the arm 34 of the wheel carrier 11. The spring strut 17 extends between the tie rod link 6, 6a and the lower A-arm 3, on one hand, and between the two upper individual links 12 and 13, on the other side, and is aligned approximately perpendicularly to the wheel contact surface 23. On the whole, during suspension movements of the wheel 1, by virtue of the two pivotal connections 2 and 3 as well as by way of the spring strut 37, a smaller wheel position change will occur in the toe-in direction during the compression than during the rebounding in the toe-out direction.

The two pivotal connections 2 and 3 may be pivotally connected by way of their joints 14, 15 and 8, 9 on the vehicle body, as illustrated, or on a subframe which is not illustrated. In all driving conditions, the effect on the wheel remains unchanged also in connection with longitudinal and lateral forces.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A wheel suspension system for driven rear wheels (1) of a motor vehicle comprising a wheel carrier (11) supported via a spring strut (37) at a body side of the motor vehicle and guided by plural individual links (12, 13) forming an upper pivotal connection (2) and by a lower pivotal connection (3) consisting of an A-arm (4, 5) and a tie rod link (6) which extends in an approximately transverse direction of the motor vehicle, the upper and lower pivotal connections (2, 3) being supported on the motor vehicle body side via joints (8, 9 and 14, 15) of different radial characteristics, the individual links (12, 13) being divergingly arranged in the transverse direction and disposed via two spaced joints (16, 17) of the wheel carrier (11), the A-arm (4, 5) being held via a joint (10) on the wheel carrier (11), and the upper and lower pivotal connections (2, 3) forming an elastokinematic wheel swivelling axis (22) disposed on an outer side of each of the rear wheels (1), with a steering pole (24) in the wheel contact plane (23) which is disposed, with respect to a driving direction (F), behind a perpendicular wheel center transverse plane (26) and outside a perpendicular wheel center longitudinal plane (25), wherein the two pivotal connections (2, 3), with respect to the driving direction (F), are arranged in inclined planes (X—X and Y—Y) extending diagonally toward the front in an upwardly directed manner and are set at an angle ($\alpha$) with respect to one another, in which inclined planes, by way of the vehicle-body-side joints (8, 9 and 14, 15) of the two pivotal connections (3, 2), spaced link rotating axes (28, 29) are formed which, in lateral view and viewed in the driving direction (F), are arranged at different angles with respect to the wheel contact plane (23) and, in top view, are arranged to be crossed with respect to one another at a crossing angle ($\beta$), and the wheel-carrier-side joints (10, 16 and 17) of the two pivotal connections (3, 2) opposite the spaced link rotating axes (28, 29), are situated in proximity to the perpendicular wheel center transverse plane (26) and directly adjacent to the perpendicular wheel center longitudinal plane (25), and the vehicle-body-side joints (8, 9 and 14, 15) of the upper and lower pivotal connections (3, 2) have radial characteristics different from each other for swivelling in a toe-in direction about a forward joint (8) of the joints (8, 9) of the lower pivotal connection (3).

2. A wheel suspension system for the driven and steered rear wheels (1) of a motor vehicle, comprising a wheel carrier (11) which is supported via a spring strut (37) at a body side of the motor vehicle and guided by plural individual links (12, 13) forming an upper pivotal connection (2) and by a lower pivotal connection (3) consisting of an A-arm (4, 5) and a tie rod link (6a) which extends in an approximately transverse direction of the motor vehicle, the pivotal connections (2, 3) being supported on the motor vehicle body side via joints (8, 9 and 14, 15) of different characteristics, the individual links (12, 13) being divergingly arranged in the transverse direction and disposed via two spaced joints (16, 17) of the wheel carrier (11), the A-arm (4, 5) being held via a joint (10) on the wheel carrier (11), and the upper and lower pivotal connections (2, 3) forming a kinematic swivelling axis (27) extending on the interior side of each of the rear wheels (1) and an elastokinematic wheel swivelling axis (22) situated on an exterior side of each of the rear wheels (1) which constitutes a steering pole (24) in a wheel contact plane (23) which, with respect to the driving direction (F), is situated behind a perpendicular wheel center transverse plane (26) and outside a perpendicular wheel center longitudinal plane (25), wherein the two pivotal connections (2, 3), with respect to the driving direction (F), are arranged in inclined planes (X—X and Y—Y) extending diagonally toward the from in an upwardly directed manner and are set at an angle (c0 with respect to one another, in which planes, by way of the vehicle-body-side joints (8, 9 and 14, 15), spaced link rotating axes (28 and 29) are formed which, in lateral view and viewed in the driving direction (F), are arranged at different angles with respect to the wheel contact plane (23) and are arranged to be crossed with respect to one another at a crossing angle (13), and the wheel-carrier-side joints (10, 16 and 17) of the two pivotal connections (3, 2), opposite the spaced link rotating axes (28, 29), are situated in proximity to a perpendicular wheel center transverse plane (26) and directly adjacent to the perpendicular wheel center longitudinal plane (25), and the vehicle-body-side joints (8. 9 and 14, 15) of the upper and lower pivotal connections (3, 2) have radial characteristics different from each other for swivelling in a toe-in direction about a forward joint (8) of the joints (8, 9) of the lower pivotal connection (3), and, between the tie rod links (6a) of each wheel side, an adjusting device for a rearwheel steering is arranged operatively connected with free inner ends (6b) of the tie rod links (6a) which extend at an angle of approximately 90° with respect to the perpendicular wheel center longitudinal plane (25).

3. The wheel suspension system according to claim 1, wherein the upper and lower pivotal connections (2, 3) are operatively held on a subframe which is elastically supported on the vehicle body.

4. The wheel suspension system according to claim 2, wherein the upper and lower pivotal connections (2, 3)

are operatively held on a subframe which is elastically supported on the vehicle body.

5. The wheel suspension system according to claim 1, wherein the A-arm of the lower pivotal connection (3) has a link (5) which, with respect to the driving direction (F), is rearwardly situated and has a vehicle-body-side joint (9) of a softer radial characteristic (32) than a vehicle-body-side joint (8) of the forward individual link (4).

6. The wheel suspension system according to claim 1, wherein a forward link (4) of the lower pivotal connection (3) is held in an elastic joint (8) comprising a vertical rotating axis (31) for the swivelling in the toe-in direction.

7. The wheel suspension system according to claim 1, wherein the lower pivotal connection (3) is an open A-arm without any cross-strut.

8. The wheel suspension system according to claim 1, wherein the vehicle-body-side joint (9) of the rearward link (5) of the lower pivotal connection (3) has a softer radial characteristic (32) than other vehicle-body-side joints (8, 14 and 15) of the upper and lower pivotal connections (2, 3).

9. The wheel suspension system according to claim 1, wherein one link rotating axis (29) of the upper pivotal connection (2) is closer to the perpendicular wheel center longitudinal plane (25) than the other link rotating axis (28) of the lower pivotal connection (3), and the spaced link rotating axes (29, 28), in top view and viewed in the driving direction (F), extend diagonally from outside to an inside front to a vehicle longitudinal center axis (30).

10. The wheel suspension system according to claim 2, wherein the wheel-carrier-side joint (10) of the A-arm (4, 5) is arranged at approximately the same distance from the perpendicular wheel center transverse plane (26) and longitudinal plane (25), and the kinematic swivelling axis (27) extends with a positive wheel caster angle (F) and a negative disturbing-force lever arm (a) through the wheel-carrier-side joint (10) and through an intersecting point (20) formed by the individual links (12, 13) of the upper pivotal connection (2).

11. The wheel suspension system according to claim 2, wherein the kinematic swivelling axis (27) extends, in lateral view, from the wheel contact plane (23) diagonally toward the upper rear in a direction opposite to the driving direction (F).

12. The wheel suspension system according to claim 11, wherein the kinematic swivelling axis (27) is arranged in front of the perpendicular wheel center transverse plane (26).

13. The wheel suspension system according to claim 1, wherein a forward link (4) of the lower pivotal connection (3) is arranged at an expansion angle with respect to the tie rod link (6) such that the steering pole (24) is outside the perpendicular wheel center longitudinal plane (25) and rearwardly of the perpendicular wheel center transverse plane (26) such that a distance (d) to the wheel center longitudinal axis (25) is larger than a second distance (b) to the wheel center transverse plane (26).

14. The wheel suspension system according to claim 1, wherein the elastokinematic swivelling axis (22) extends, from the steering pole (24) in the wheel contact plane (23) situated, in lateral view, behind the perpendicular wheel center transverse plane (26) and diagonally forward with respect to the driving direction (F), so as to intersect with the wheel center transverse plane (26) approximately at the level of the wheel-carrier-side joint (17) of a rearward one of the individual links (13) of the upper pivotal connection (2).

15. The wheel suspension system according to claim 1, wherein the wheel-carrier-side joint (10) of the A-arm (4, 5) is arranged in front of the wheel center transverse plane (26) closer to the perpendicular wheel center longitudinal plane (25) than to the corresponding joint (19) of the tie rod link (6, 6a) behind the wheel center transverse plane (26).

16. The wheel suspension system according to claim 2, wherein the wheel-carrier-side joint (10) of the A-arm (4, 5) is arranged in front of the wheel center transverse plane (26) closer to the perpendicular wheel center longitudinal plane (25) than to the corresponding joint (19) of the tie rod link (6, 6a) behind the wheel center transverse plane (26).

17. The wheel suspension system according to claim 1, wherein the tie rod link (6, 6a) is arranged approximately in a horizontal plane in which the wheel-carrier-side joint (10) of the A-arm (4,5) is located and is held in a joint (19) of an inwardly projecting arm (34) of the wheel carrier (11), and the joint (19) of the inwardly projecting arm (34) is arranged between the vehicle-body-side and the wheel-carrier-side joints of the two pivotal connections (2, 3) and substantially closer to the wheel-carrier-side joints (10, 16 and 17) than to the vehicle-body-side joints (8, 9 and 14, 15).

18. The wheel suspension system according to claim 2, wherein the tie rod link (6, 6a) is arranged approximately in a horizontal plane in which the wheel-carrier-side joint (10) of the A-arm (4,5) is located and is held in a joint (19) of an inwardly projecting arm (34) of the wheel carrier (11), and the joint (19) of the inwardly projecting arm (34) is arranged between the vehicle-body-side and the wheel-carrier-side joints of the two pivotal connections (2, 3) and substantially closer to the wheel-carrier-side joints (10, 16 and 17) than to the vehicle-body-side joints (8, 9 and 14, 15).

19. The wheel suspension system according to claim 17, wherein the wheel-carrier-side joint (19) of the tie rod (6, 6a) and a lower joint of the spring strut (37) are arranged on a common shaft (35) and are screwed to the inwardly projecting arm (34) of the wheel carrier (11).

20. The wheel suspension system according to claim 18, wherein the wheel-carrier-side joint (19) of the tie rod (6, 6a) and a lower joint of the spring strut (37) are arranged on a common shaft (35) and are screwed to the inwardly projecting arm (34) of the wheel carrier (11).

21. The wheel suspension system according to claim 19, wherein the tie rod link (6) extends, in top view and viewed in the driving direction (F), diagonally from the outside front to the inside rear to a vehicle longitudinal center axis (30).

22. The wheel suspension system according to claim 1, wherein the individual links (12, 13) of the upper pivotal connection (2) are supported with a relatively large base on the vehicle body side in the joints (14, 15) and have an expanding angle with respect to one another such that the elastokinematic swivelling axis (22) extends in a horizontal plane placed through the wheel spin axis (40) to the perpendicular wheel center longitudinal plane (25) with a relatively large distance (e).

23. The wheel suspension system according to claim 1, wherein the wheel-carrier-side joints (16, 17) of the individual links (12, 13) of the upper pivotal connection (2) are arranged at approximately the same distance to the perpendicular wheel center transverse plane (16), and the vehicle-body-side joint (14) of one (12) of the individual links (12, 13) is situated closer to the perpendicular wheel center transverse plane (26) than the joint (15) of the other (13) of the individual links (12, 13).

24. The wheel suspension system according to claim 26, wherein the vehicle-body-side joint (15) of a rearward one (13) of the individual links (12, 13) of the upper pivotal connection (2) has a softer characteristic in the radial direction than the vehicle body-side joint (14) of the other (12) of the individual links (12, 13) and has a harder radial characteristic than the vehicle-body-side joint (9) of the rearward link (5) of the lower pivotal connection (3).

25. The wheel suspension system according to claim 1, wherein the upper and lower pivotal connections (2, 3) arranged in the respective ones of the inclined planes (X—X and Y—Y) are set, in lateral view, diagonally with respect to one another so as to be swivellable about the link rotating axes (28, 29) formed by the vehicle-body-side joints (8, 9 and 14, 15) such that a pitching pole (N) which, with respect to the driving direction (F), is situated in front of the wheel spin axis (40), provides an antidive characteristic with a linear movement of the wheel contact point (R) along a spring path.

26. The wheel suspension system according to claim 25, wherein the wheel contact point (R) has a linear moving direction at an angle (39) with respect to the wheel contact surface (23) and extends, with respect to the driving direction (F), diagonally rearwardly.

27. The wheel suspension system according to claim 1, wherein the upper and lower pivotal connections (2, 3) arranged in the respective ones of the inclined planes (X—X and Y—Y) are set, in lateral view, with respect to one another to provide a progressive antisquat characteristic via progressive rearward movement of the wheel spin axis (40) on a curved path (41) with respect to the driving direction (F) during compression.

28. The wheel suspension system according to claim 1, wherein the two pivotal connections (2, 3) are arranged with respect to one another and disposed on the vehicle body side such that the wheel (1) during compression has a smaller wheel position change in the toe-in direction than during rebounding in a toe-out direction.

29. The wheel suspension system according to claim 1, wherein the spring strut (37) is arranged., in lateral view, approximately in parallel to the perpendicular wheel center transverse plane (26) and is supported on the wheel carrier (11) with respect to the driving direction (F), behind the perpendicular wheel center transverse plane (26), the spring strut (37) extending between the tie rod link (6, 6a) and the lower pivotal connection (3), on one side, and between the plural individual links (12, 13) of the upper pivotal connection (2), and the spring strut (37) being set approximately perpendicularly with respect to the wheel contact plane (23).

30. The wheel suspension system according to claim 2, wherein the spring strut (37) is arranged, in lateral view, approximately in parallel to the perpendicular wheel center transverse plane (26) and is supported on the wheel carrier (11) with respect to the driving direction (F), behind the perpendicular wheel center transverse plane (26), the spring strut (37) extending between the tie rod link (6, 6a) and the lower pivotal connection (3), on one side, and between the plural individual links (12, 13) of the upper pivotal connection (2), and the spring strut (37) being set approximately perpendicularly with respect to the wheel contact plane (23).

* * * * *